US010556301B2

(12) United States Patent
Baker (10) Patent No.: US 10,556,301 B2
(45) Date of Patent: Feb. 11, 2020

(54) TUBE CLAMP ASSEMBLY

(71) Applicant: Steven Christopher Baker, Chillicothe, MO (US)

(72) Inventor: Steven Christopher Baker, Chillicothe, MO (US)

(*) Notice: Subject to any disclaimer, the term of this patent is extended or adjusted under 35 U.S.C. 154(b) by 0 days.

(21) Appl. No.: 15/679,638

(22) Filed: Aug. 17, 2017

(65) Prior Publication Data
US 2019/0054578 A1 Feb. 21, 2019

(51) Int. Cl.
*B23K 37/04* (2006.01)
*B23K 37/053* (2006.01)

(52) U.S. Cl.
CPC ...... *B23K 37/0533* (2013.01); *B23K 37/0435* (2013.01)

(58) Field of Classification Search
CPC .............. B23K 3/087; B23K 37/04; B23K 37/0426–0435; B23K 37/053–0531
USPC ................ 228/212–213, 44.5, 49.3
See application file for complete search history.

(56) References Cited

U.S. PATENT DOCUMENTS

| 1,935,902 | A | * | 11/1933 | Brant | ........... H02G 15/26 |
| | | | | | 137/317 |
| 2,379,014 | A | * | 6/1945 | Lowe | ........... B23Q 3/00 |
| | | | | | 24/116 R |
| 2,585,343 | A | * | 2/1952 | Newlon, Jr. | ........ B23K 37/0536 |
| | | | | | 269/131 |
| 2,755,761 | A | * | 7/1956 | Carr | ........... B23K 37/053 |
| | | | | | 228/212 |
| 2,968,978 | A | * | 1/1961 | Wheeler | ........... B25B 1/205 |
| | | | | | 269/130 |
| 3,586,057 | A | * | 6/1971 | Lambert | ........... F16L 55/1705 |
| | | | | | 138/99 |
| 4,415,188 | A | * | 11/1983 | Ginter, Jr. | ........... F01N 13/1805 |
| | | | | | 24/277 |
| 4,524,959 | A | * | 6/1985 | Kubo | ........... B23K 37/0533 |
| | | | | | 269/156 |
| 4,586,647 | A | * | 5/1986 | Dearman | ........... F16L 3/20 |
| | | | | | 228/49.3 |
| 4,623,085 | A | * | 11/1986 | Dearman | ........... B23K 37/0533 |
| | | | | | 228/49.3 |
| 4,726,575 | A | * | 2/1988 | Dearman | ........... B23K 37/0533 |
| | | | | | 269/131 |
| 4,750,662 | A | | 6/1988 | Kagimoto | |

(Continued)

*Primary Examiner* — Kiley S Stoner
(74) *Attorney, Agent, or Firm* — Matthew M. Googe; Robinson IP Law, PLLC (57) ABSTRACT

A tube clamp assembly for aligning and clamping a pair of tube ends includes: an elongate bar having a channel shaped to substantially conform to receive outer surfaces of adjacent tube ends when the channel is aligned parallel to a longitudinal axis of the adjacent tube ends, the elongate bar further including a bore oriented perpendicular to the longitudinal axis of the adjacent tube ends; a clamping member having an elongate body oriented parallel to the longitudinal axis of the adjacent tube ends, the clamping member having a bore formed therethrough, the bore substantially aligned with the bore of the elongate bar; at least one cable attached to the clamping member and extending around a distal outer wall of the adjacent tube ends; an elongate threaded bolt extending from a first end through the bore of the clamping member and into the bore of the bar member.

9 Claims, 5 Drawing Sheets

(56) References Cited

U.S. PATENT DOCUMENTS

| | | | | |
|---|---|---|---|---|
| 5,727,778 | A * | 3/1998 | Nodar | B25B 1/205 |
| | | | | 269/296 |
| 5,798,021 | A * | 8/1998 | Stiles | B23K 37/0435 |
| | | | | 156/274.2 |
| 6,076,724 | A * | 6/2000 | Collins, Jr. | B23K 37/0435 |
| | | | | 228/44.3 |
| 6,349,869 | B1 * | 2/2002 | McBee | B23K 37/0435 |
| | | | | 228/49.3 |
| 6,382,496 | B1 * | 5/2002 | Harger | B23K 23/00 |
| | | | | 228/234.3 |
| 6,641,124 | B2 * | 11/2003 | Melanson | B23K 37/0533 |
| | | | | 228/49.3 |
| 7,195,143 | B2 | 3/2007 | Reeson | |
| 7,780,065 | B2 * | 8/2010 | Vermaat | B23K 37/0531 |
| | | | | 228/212 |
| 8,186,643 | B2 * | 5/2012 | Luo | F16L 41/008 |
| | | | | 248/230.8 |
| 8,578,578 | B2 * | 11/2013 | Melanson | B23K 31/027 |
| | | | | 269/43 |
| 8,985,565 | B2 * | 3/2015 | Mann | F16L 23/003 |
| | | | | 269/40 |
| 9,604,320 | B1 * | 3/2017 | Fuentes | F16M 11/28 |
| 2011/0107574 | A1 * | 5/2011 | Melanson | B23K 31/027 |
| | | | | 29/272 |

* cited by examiner

TUBE CLAMP ASSEMBLY

FIELD

This disclosure relates to the field of tools. More particularly, this disclosure relates to a tube clamp assembly for aligning and clamping a pair of adjacent tube ends.

BACKGROUND

Welding of adjoining pipes typically requires that the pipes be in alignment with one another along lengths of the adjoining pipes. It is often difficult to achieve alignment of pipe ends and to secure those pipe ends in an aligned position so that the ends may be joined by welding. These difficulties are enhanced when welding of adjoining pipe ends is being performed in a confined environment. For example, boiler tubes are often repaired or replaced by removing sections of pipe within the boiler and welding replacement tubes in place of the existing tubes. This requires an installer of the tube to clamp the tube ends in the confined space.

While existing tools exist for aligning tube ends prior to joining the tube ends by welding, these tools are typically cumbersome and difficult to manipulate into a proper position in a confined space. Further, many existing tools require additional hand tools or are otherwise complicated to install around adjoining tube ends, thereby increasing an amount of time required to clamp the tube ends for welding. For example, many existing tools require the use of a wrench or other hand tools to locate the tools around adjoining tube ends and to secure the tool in place. The complexity of existing tools also reduces their effectiveness in confined environments, such as within a boiler.

What is needed, therefore, is a tube clamp assembly for aligning and clamping a pair of adjacent tube ends during a welding operation that is capable of being installed in a confined environment.

SUMMARY

The above and other needs are met by a tube clamp assembly for aligning and clamping a pair of adjacent tube ends during a welding operation. In a first aspect, a tube clamp assembly includes: an elongate bar having a channel shaped to substantially conform to receive outer surfaces of adjacent tube ends when the channel is aligned parallel to a longitudinal axis of the adjacent tube ends, the elongate bar further including a bore oriented perpendicular to the longitudinal axis of the adjacent tube ends; a clamping member having an elongate body oriented parallel to the longitudinal axis of the adjacent tube ends, the clamping member having a bore formed therethrough, the bore substantially aligned with the bore of the elongate bar; at least one cable attached to the clamping member and extending around a distal outer wall of the adjacent tube ends; and an elongate threaded bolt extending from a first end through the bore of the clamping member and into the bore of the bar member.

In one embodiment, the at least one cable is secured to the clamping member at first and second ends of the cable, and a middle portion of the cable is looped around one or more posts extending from the elongate body of the clamping member.

In another embodiment, the clamping member includes a first post formed adjacent a first end of the elongate body and a second post formed adjacent a second end of the elongate body. In yet another embodiment, the tube clamp assembly further includes a handle formed on the first end of the elongate threaded bolt. In one embodiment, the tube clamp assembly further includes a bolt head formed on the first end of the elongate threaded bolt.

In one embodiment, the channel of the elongate bar is substantially v-shaped. In another embodiment, the tube clamp assembly further includes a notch formed at a middle of the elongate bar adjacent the tube ends.

In a second aspect, a tube clamp assembly for alignging and clamping a pair of tube ends includes: an elongate bar having a channel shaped to substantially conform to receive outer surfaces of adjacent tube ends when the channel is aligned parallel to a longitudinal axis of the adjacent tube ends, the elongate bar further including a bore oriented perpendicular to the longitudinal axis of the adjacent tube ends; a clamping member having an elongate body oriented parallel to the longitudinal axis of the adjacent tube ends, the clamping member having a bore formed therethrough, the bore substantially aligned with the bore of the elongate bar; at least one cable attached to the clamping member and extending around a distal outer wall of the adjacent tube ends, the at least one cable secured to the clamping member at first and second ends of the cable, and wherein a middle portion of the cable is looped around one or more posts extending from the elongate body of the clamping member; and an elongate threaded bolt extending from a first end through the bore of the clamping member and into the bore of the bar member.

In one embodiment, the clamping member includes a first post formed adjacent a first end of the elongate body and a second post formed adjacent a second end of the elongate body.

In a third aspect, a tube clamp assembly for aligning and clamping a pair of tube ends includes: an elongate bar having a channel shaped to substantially conform to receive outer surfaces of adjacent tube ends when the channel is aligned parallel to a longitudinal axis of the adjacent tube ends, the elongate bar further including a bore oriented perpendicular to the longitudinal axis of the adjacent tube ends; a clamping member having an elongate body oriented parallel to the longitudinal axis of the adjacent tube ends, the clamping member having a bore formed therethrough, the bore substantially aligned with the bore of the elongate bar, the clamping member including a first post formed adjacent a first end of the elongate body and a second post formed adjacent a second end of the elongate body; at least one cable attached to the clamping member and extending around a distal outer wall of the adjacent tube ends, the at least one cable secured to the clamping member at first and second ends of the cable, and wherein a middle portion of the cable is looped around the first post and the second post extending from the elongate body of the clamping member; and an elongate threaded bolt extending from a first end through the bore of the clamping member and into the bore of the bar member.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
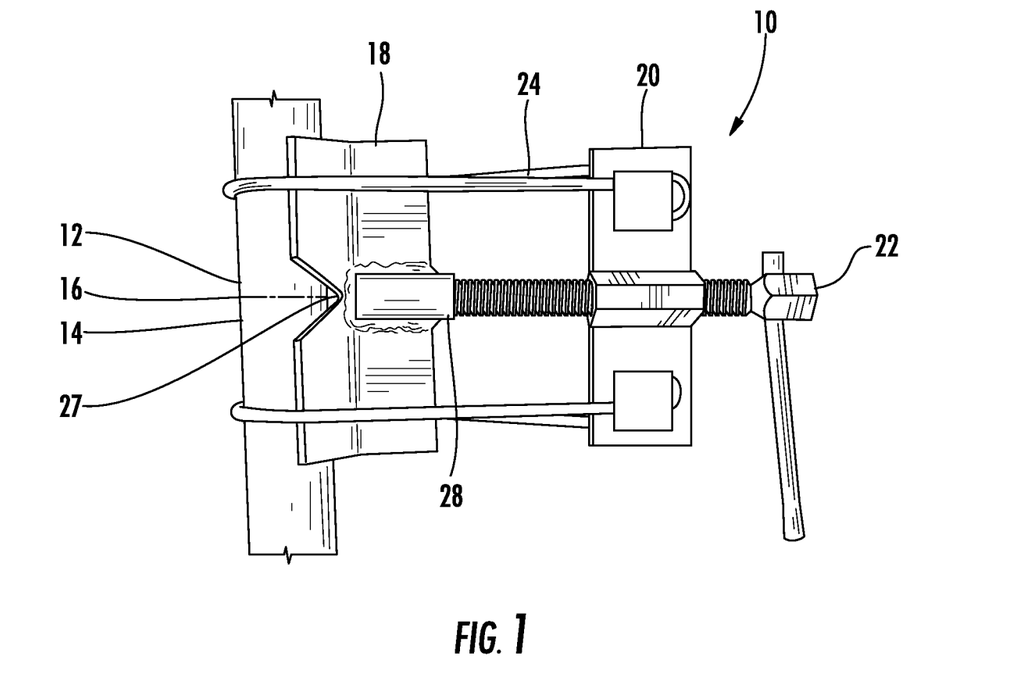
FIG. 1 shows a first side view of a tube clamp assembly according to one embodiment of the present disclosure.

FIG. 1 shows a basic embodiment of a tube clamp assembly 10 for securing a pair of tube ends during welding or other adhesion of the tube ends to one another. The tube clamp assembly is mounted around ends of adjacent tubes such that the tubes are held in place while the tubes are joined, such as by welding the tubes to one another.

Figure 2:
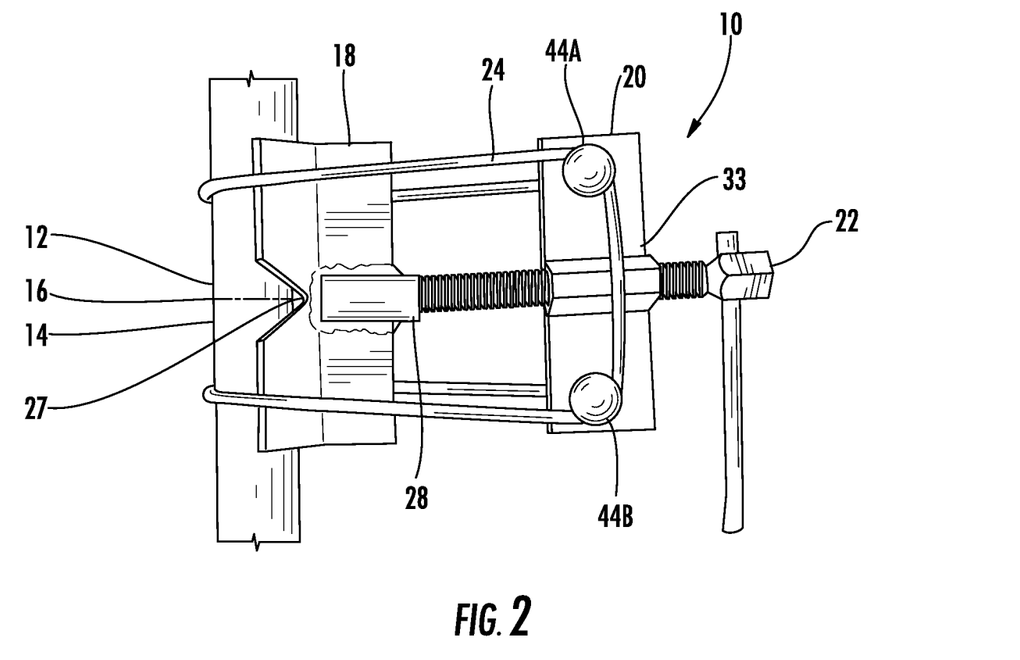
FIG. 2 shows a second side view of a tube clamp assembly according to one embodiment of the present disclosure.

Referring to FIGS. 1 and 2, the tube clamp assembly is mounted around a first tube end 12 and a second tube end 14. The first tube end 12 and second tube end 14 are located adjacent one another such and a seam 16 is located between the first tube end 12 and second tube end 14. The first tube end 12 and second tube end 14 are typically joined, such as by welding of the first tube end 12 to the second tube end 14 along the seam 16 when the first tube end 12 and second tube end 14 are aligned with one another. The first tube end 12 and second tube end 14 are preferably concentrically aligned when located adjacent to one another.

The tube clamp assembly 10 includes an elongate bar 18, a clamping member 20 adjustably associated with the elongate bar 18, a bolt 22 extending through the clamping member 20 to the elongate bar 18, and at least one cable 24 attached to the clamping member 20 and extending around a distal side of the first tube end 12 and second tube end 14. The tube clamp assembly 10 is removably attached around the first tube end 12 and second tube end 14 with the cable 24. The first tube end 12 and second tube end 14 are retained against the elongate bar 18 with the cable 24, and adjustment of the clamping member 20 with respect to the elongate bar 18 tightens the cable against the first tube end 12 and second tube end 14 to retain the first tube end 12 and second tube end 14 in alignment during joining of the first tube end 12 and second tube end 14.

Figure 3:
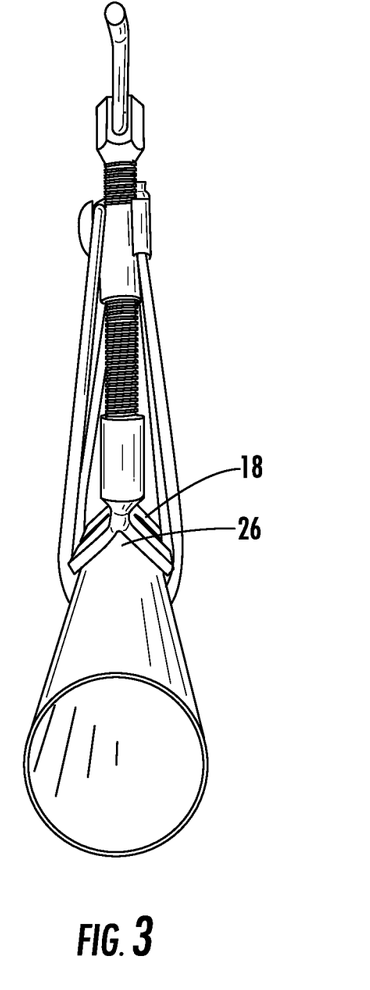
FIG. 3 shows a lengthwise view of a tube clamp assembly according to one embodiment of the present disclosure.

Referring now to FIG. 3, the elongate bar 18 includes a channel 26 that is shaped to substantially conform to and receive outer surfaces of the first tube end 12 and second tube end 14. The channel 26 is preferably is formed of a section of angled metal, such as steel or iron, such that the channel 26 is V-shaped when the channel 26 contacts the first tube end 12 and second tube end 14. While the channel 26 is preferably V-shaped, it is also understood that the channel 26 may be formed into a variety of other suitable shapes, such as a rounded channel or square-shaped channel that receives the first tube end 12 and second tube end 14 within the channel 26. The channel 26 may further include a notch 27 formed at a midpoint of the channel 26 to allow a user to weld along the seam 16 between the first tube end 12 and the second tube end 14.

Referring again to FIGS. 1 and 2, the elongate bar 18 further includes a receptacle 28 formed on the elongate bar 18 and extending perpendicular to a length of the channel 26. The receptacle 28 preferably includes a smooth interior bore and is shaped to receive an end of the bolt 22 as described in greater detail below. A window 30 (FIG. 4) may be formed through a wall of the receptacle 28 such that a set screw or other retention device may be inserted through the window 30 into an interior of the receptacle to engage the bolt 22 and retain the bolt 22 within the receptacle of the elongate bare 18.

The clamping member 20 includes a threaded nut 32 formed at a center of the clamping member 20. The threaded nut 32 includes a threaded interior bore formed through the threaded nut 32 for engaging the bolt 22. The clamping member 20 further includes a body 34 attached to the threaded nut 32. The body 34 preferably includes wings 36A and 36B formed on opposite sides of the threaded nut 32. The wings 36A and 36B are preferably aligned with a length of the first tube end 12 and second tube end 14, and is also preferably aligned parallel to the elongate bar 18.

Figure 5:
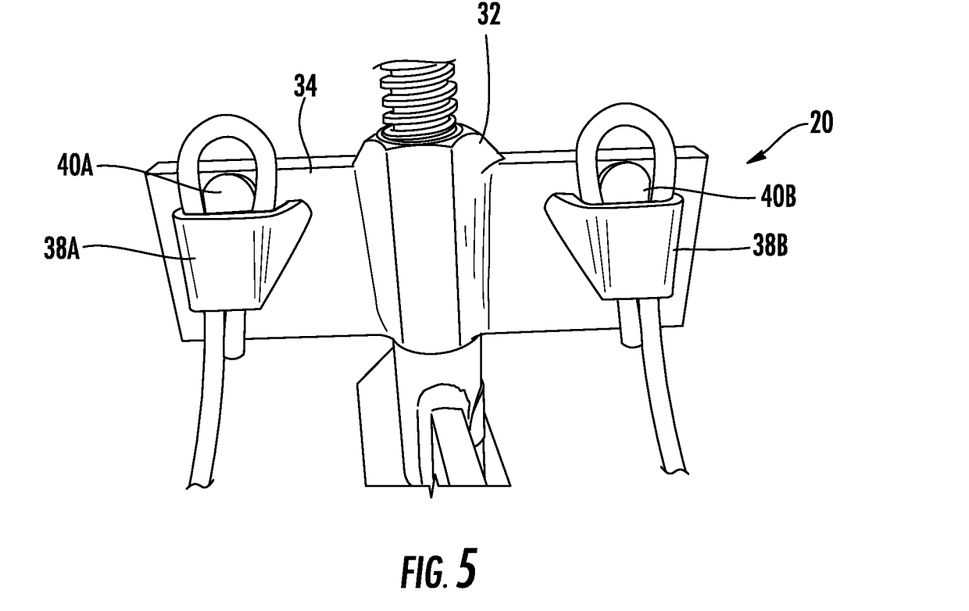
FIG. 5 shows a close-up view of a clamping member of a tube clamp assembly according to one embodiment of the present disclosure.
Figure 6:
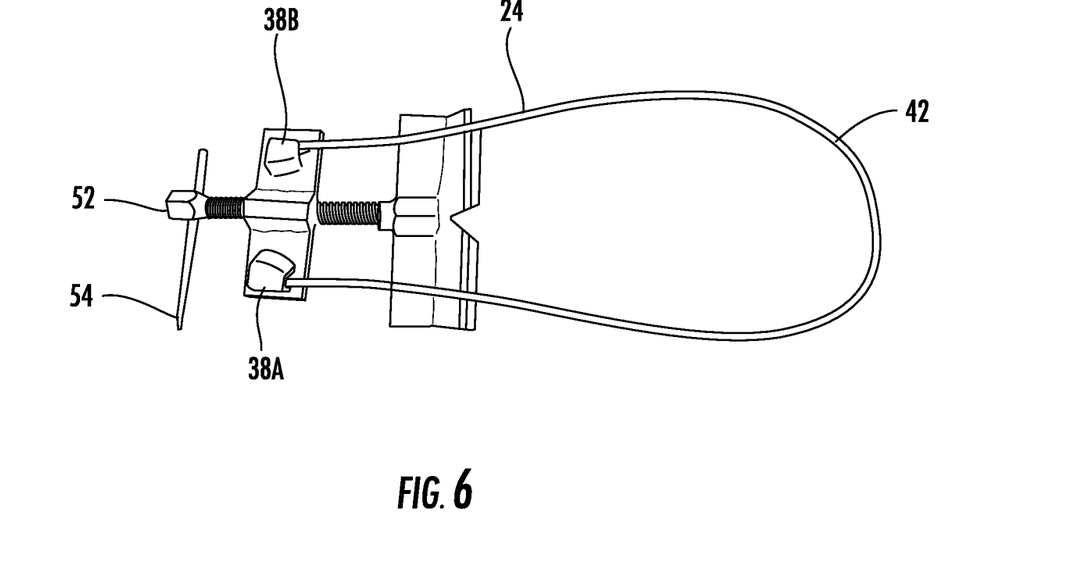
FIG. 6 shows a side view of a tube clamp assembly disengaged from tube ends according to one embodiment of the present disclosure.

The at least one cable 24 is attached to the body 34. Referring to FIG. 5, the cable 24 is fixed to the body 34 on a first side of the body. In a preferable embodiment, ends of the cable are attached to the first side of the body 34 with tackle assemblies 38A and 38B. Ends of the cable 24 are looped through the tackle assemblies 38A and 38B around wedges 40A and 40B located within the tackle assemblies 38A and 38B. When tension is applied to the cable 24, the wedges 40A and 40B are pulled into the tackle assemblies 38A and 38B, thereby securing ends of the cable 24 to the tackle assemblies 38A and 38B. As shown in FIG. 6, when the cable 24 is attached to the tackle assemblies 38A and 38B, the cable forms a loop 42 between ends of the cable.

The cable 24 is preferably formed of braided steel or other suitable materials. The cable 24 also may include a protective portion formed on an outside of the cable. For example, a plastic or other material may be formed over a surface of the cable 24 to protect the cable 24 and further prevent the cable 24 from damaging a surface of the first tube end 12 and second tube end 14.

Referring to FIG. 2, the body 34 includes a pair of posts 44A and 44B formed on a second side of the body, preferably opposite the tackle assemblies 38A and 38B located on the first side of the body 34. The posts 44A and 44B preferably include flared heads such that the posts 44A and 44B are configured to engaged the cable 24 when the loop 42 of the cable 24 is located around the posts 44A and 44B.

Figure 4:
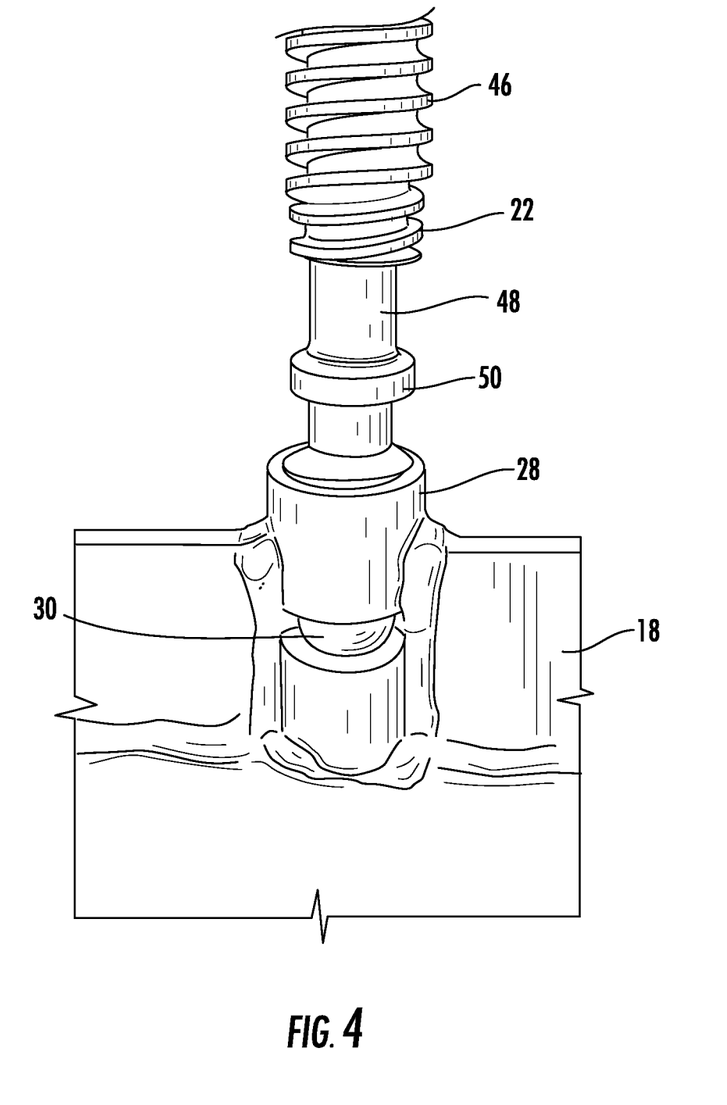
FIG. 4 shows a close-up view of a tube clamp assembly according to one embodiment of the present disclosure.

The bolt 22 preferably includes a threads 46 formed along a length of the bolt 22 (FIG. 4). The threads are sized to threadably engage with the threaded interior bore of the threaded nut 32. The bolt 22 also includes a threadless end portion 48 that is shaped to insert into the receptacle 28 of the elongate bar 18. The threadless end portion 48 is insertable into the receptacle 28 and engages the receptacle such that the bolt 22 is freely rotated relative to the elongate bar 18. The threadless end portion 48 may also include a ring 50 formed on the threadless end portion 48. The ring 50 may also fit within the receptacle 28 of the elongate bar 18 such that the ring 50 fits below the window 30 formed in the wall of the receptacle 28. A screw or other fastener may be installed through the wall of the receptacle 28 such that the bolt 22 may not be removed from the receptacle 28 because the ring 50 contacts the fastener.

Referring again to FIG. 6, the bolt 22 may include a bolt head 52 formed on an end of the bolt 22 distal from the threadless end portion 48. The bolt head 52 may further include a handle 54 formed through the bolt head 52 that allows a user to manually engage the bolt 22 and rotate the bolt 22.

Figure 7:
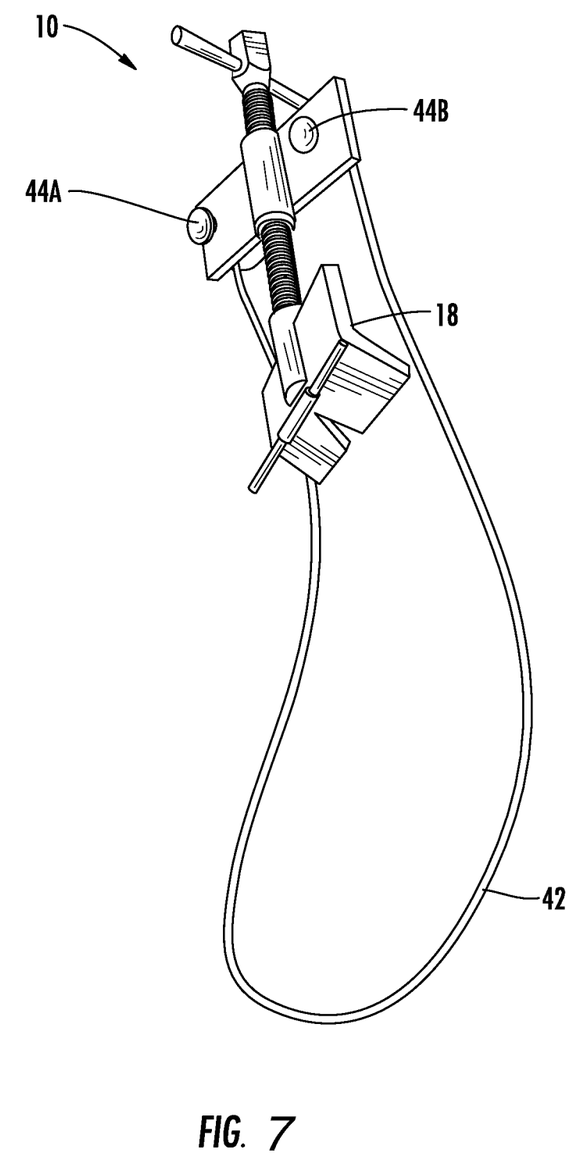
FIG. 7 shows a tube clamp assembly and attached cable according to one embodiment of the present disclosure.

The cable 24, when formed into the loop 42, is configured to fit around the posts 44A and 44B after wrapping around at least a portion of the first tube end 12 and second tube end 14. As shown in FIG. 7, when the tube clamp assembly 10 is not attached to tube ends for joining, the cable 24 is attached to the at the tackle assemblies 38A and 38B and forms the loop 42.

In operation, a user positions the elongate bar 18 along the first tube end 12 and second tube end 14 such that both the first tube end 12 and second tube end 14 are adjacent the elongate bar 18. The cable loop 42 is then pulled around the first tube end 12 and second tube end 14 and wrapped around posts 44A and 44B, as shown in FIGS. 2 and 3. After wrapping the cable 24 around the first tube end 12 and second tube end 14, the user may then tighten the tube clamp assembly 10 against the first tube end 12 and second tube end 14 to secure the tube clamp assembly 10 in place and to secure the first tube end 12 adjacent to the second tube end 14. To tighten the tube clamp assembly 10, the user rotates the bolt 22 by engaging the handle 54 formed on the bolt head 52. As the bolt 22 rotates, the clamping member 20 moves along the threads 46 of the bolt 22 relative to the elongate bar 18. As the clamping member 20 moves away from the elongate bar 18, the cable 24 is tightened, thereby pulling the first tube end 12 and second tube end 14 against the elongate bar 18. When the clamping member 20 moves towards the elongate bar 18 along the threads 46 of the bolt 22, the cable 42 is loosened, thereby allowing a user to remove the tube clamp assembly 10 from the first tube end 12 and second tube end 14.

The tube clamp assembly 10 of the present disclosure advantageously secures tube ends adjacent to one another for joining, such as by welding the tube ends together. The tube clamp assembly 10 requires minimal space for operation, and only requires that a user be able to access the tube clamp assembly 10 on one side of tube ends to be joined. Further, the user may tighten the tube clamp assembly against tube ends without the use of tools, thereby simplifying installation of the tube clamp assembly to tube ends.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A tube clamp assembly for aligning and clamping a pair of tube ends comprising:
    an elongate bar having a channel shaped to substantially conform to receive outer surfaces of adjacent tube ends when the channel is aligned parallel to a longitudinal axis of the adjacent tube ends, the elongate bar further including a bore oriented perpendicular to the longitudinal axis of the adjacent tube ends;
    a clamping member having an elongate body oriented parallel to the longitudinal axis of the adjacent tube ends, the clamping member having a bore formed therethrough, the bore substantially aligned with the bore of the elongate bar;
    at least one cable attached to the clamping member at first and second ends of the cable and extending around a distal outer wall of the adjacent tube ends, wherein a middle portion of the cable is looped around one or more posts extending from the elongate body of the clamping member;
    an elongate threaded bolt extending from a first end through the bore of the clamping member and into the bore of the bar member.

2. The tube clamp assembly of claim 1, the clamping member including a first post formed adjacent a first end of the elongate body and a second post formed adjacent a second end of the elongate body.

3. The tube clamp assembly of claim 1, further comprising a handle formed on the first end of the elongate threaded bolt.

4. The tube clamp assembly of claim 1, further comprising a bolt head formed on the first end of the elongate threaded bolt.

5. The tube clamp assembly of claim 1, wherein the channel of the elongate bar is substantially v-shaped.

6. The tube clamp assembly of claim 1, further comprising a notch formed at a middle of the elongate bar adjacent the tube ends.

7. A tube clamp assembly for aligning and clamping a pair of tube ends comprising:
    an elongate bar having a channel shaped to substantially conform to receive outer surfaces of adjacent tube ends when the channel is aligned parallel to a longitudinal axis of the adjacent tube ends, the elongate bar further including a bore oriented perpendicular to the longitudinal axis of the adjacent tube ends;
    a clamping member having an elongate body oriented parallel to the longitudinal axis of the adjacent tube ends, the clamping member having a bore formed therethrough, the bore substantially aligned with the bore of the elongate bar;
    at least one cable attached to the clamping member and extending around a distal outer wall of the adjacent tube ends, the at least one cable secured to the clamping member at first and second ends of the cable, and wherein a middle portion of the cable is looped around one or more posts extending from the elongate body of the clamping member;
    an elongate threaded bolt extending from a first end through the bore of the clamping member and into the bore of the bar member.

8. The tube clamp assembly of claim 7, the clamping member including a first post formed adjacent a first end of the elongate body and a second post formed adjacent a second end of the elongate body.

9. A tube clamp assembly for aligning and clamping a pair of tube ends comprising:
- an elongate bar having a channel shaped to substantially conform to receive outer surfaces of adjacent tube ends when the channel is aligned parallel to a longitudinal axis of the adjacent tube ends, the elongate bar further including a bore oriented perpendicular to the longitudinal axis of the adjacent tube ends;
- a clamping member having an elongate body oriented parallel to the longitudinal axis of the adjacent tube ends, the clamping member having a bore formed therethrough, the bore substantially aligned with the bore of the elongate bar, the clamping member including a first post formed adjacent a first end of the elongate body and a second post formed adjacent a second end of the elongate body;
- at least one cable attached to the clamping member and extending around a distal outer wall of the adjacent tube ends, the at least one cable secured to the clamping member at first and second ends of the cable, and wherein a middle portion of the cable is looped around the first post and the second post extending from the elongate body of the clamping member;
- an elongate threaded bolt extending from a first end through the bore of the clamping member and into the bore of the bar member.

* * * * *